United States Patent
Wanierke

(10) Patent No.: US 10,659,176 B2
(45) Date of Patent: May 19, 2020

(54) METHOD AND SYSTEM FOR IDENTIFYING A RADIO FREQUENCY TRANSMITTER

(71) Applicant: Rohde & Schwarz GmbH & Co. KG, Munich (DE)

(72) Inventor: Otmar Wanierke, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/900,601

(22) Filed: Feb. 20, 2018

(65) Prior Publication Data

US 2019/0260481 A1    Aug. 22, 2019

(51) Int. Cl.
| | |
|---|---|
| H04B 17/12 | (2015.01) |
| H04W 24/08 | (2009.01) |
| H04L 25/02 | (2006.01) |
| H04B 17/10 | (2015.01) |

(52) U.S. Cl.
CPC .......... *H04B 17/12* (2015.01); *H04B 17/104* (2015.01); *H04L 25/022* (2013.01); *H04W 24/08* (2013.01)

(58) Field of Classification Search
CPC ................................. H04J 13/004; H04J 13/18
See application file for complete search history.

(56) References Cited

U.S. PATENT DOCUMENTS

| | | | |
|---|---|---|---|
| 7,072,381 B2 * | 7/2006 | Atarashi | H04B 1/7113 375/144 |
| 8,009,768 B1 * | 8/2011 | Lee | H04L 27/2679 370/203 |

\* cited by examiner

*Primary Examiner* — Marsha D Banks Harold
*Assistant Examiner* — Elton Williams
(74) *Attorney, Agent, or Firm* — Christensen O'Connor Johnson Kindness PLLC

(57) ABSTRACT

A method for identifying a radio frequency transmitter is described, wherein a radio frequency signal is received via a radio frequency channel, the radio frequency signal including at least one radio frequency sequence. The sequence received is split into a plurality of chunks. The radio frequency channel is equalized by using a first subset of the plurality of chunks. The amplitude of each chunk of a second subset of the plurality of chunks is measured in the equalized radio frequency channel. The at least one amplitude is used for deciding whether the at least one sequence of the radio frequency signal corresponds to a sequence listed in a list. Further, a system for identifying a radio frequency transmitter is described.

16 Claims, 3 Drawing Sheets

METHOD AND SYSTEM FOR IDENTIFYING A RADIO FREQUENCY TRANSMITTER

TECHNICAL FIELD

Embodiments of the present disclosure relate to a method for identifying a radio frequency transmitter as well as a system for identifying a radio frequency transmitter.

BACKGROUND

Nowadays, many radio frequency signals are exchanged by over-the-air systems (OTA systems) so that it becomes difficult to detect a radio frequency transmitter that transmits a certain radio frequency signal. The radio frequency signal transmitted by the radio frequency transmitter comprises a radio frequency sequence that is repeated periodically. The respective periodically transmitted radio frequency sequence distinguishes the radio frequency transmitter from other radio frequency transmitters.

Typically, a radio frequency receiver configured to receive radio frequency signals receives several radio frequency sequences due to the different active radio frequency transmitters each transmitting the radio frequency signals. Thus, the radio frequency receiver configured to receive radio frequency signals receives a mixture of different radio frequency sequences (in random order) so that the probability is increased to detect a so-called ghost code (false detection). The respective probability further increases due to the increasing number of radio frequency transmitters.

Generally, the radio frequency sequences transmitted may relate to training sequences, synchronizing sequences, reference sequences and/or data packets as well as the respective radio frequency signals.

So far, complicated correlation procedures with regard to the time domain and the frequency domain are used for identifying a certain radio frequency transmitter. In addition, coded signals are decoded by appropriate decoders. Hence, it is complicate to identify a certain radio frequency transmitter.

SUMMARY

Thus, there is a need for a simpler and cost-efficient possibility to detect or rather identify a radio frequency transmitter.

Embodiments of the present disclosure provides a method for identifying a radio frequency transmitter, with the following steps:

Receiving a radio frequency signal via a radio frequency channel, the radio frequency signal comprising at least one radio frequency sequence, Splitting the sequence received into a plurality of chunks, Equalizing the radio frequency channel by using a first subset of sa the id plurality of chunks, Measuring the amplitude of each chunk of a second subset of the plurality of chunks in the equalized radio frequency channel, and Using the at least one amplitude for deciding whether the at least one sequence of the radio frequency signal corresponds to a sequence listed in a list.

Further, embodiments of the present disclosure provide a system for identifying a radio frequency transmitter emitting at least one radio frequency sequence, comprising at least one receiving antenna unit connected to a radio frequency channel and a processing unit, the processing unit comprising a splitting unit configured to split the radio frequency sequence received into a plurality of chunks, the processing unit further comprising an equalization unit configured to equalize the radio frequency channel by using a first subset of the plurality of chunks, the processing unit further comprising a measuring unit configured to measure the amplitude of each chunk of a second subset of the plurality of chunks in the equalized radio frequency channel, and the processing unit further comprising a decision unit configured to use the at least one amplitude for deciding whether the at least one sequence of the radio frequency signal corresponds to a sequence listed in a list.

The main idea relates to the fact that a radio frequency sequence can be split into a number of components wherein the components can be used at least partly to equalize the radio frequency channel used for processing the radio frequency signal, in particular the radio frequency sequence(s) encompassed by the radio frequency signal. Hence, an equalized radio frequency channel is provided that can be used to measure the amplitude(s) of the other component(s) of the radio frequency sequence received. The sequence received, in particular the amplitude(s) derived therefrom, is then taken into account in order to evaluate whether the radio frequency sequence received corresponds to one of the predefined sequences listed.

Thus, the list comprises several known sequences which are listed appropriately, in particular parameters related to the sequence. Particularly, the sequences are pre-defined ones.

Therefore, the list relates to several pre-defined sequences, in particular at least one pre-defined sequence.

Accordingly, it is evaluated whether the sequence received corresponds to one of the sequences listed in the list (defined previously), in particular the only sequence listed.

The list may comprise a number of sequences wherein these sequences may be taken into account for comparison reasons. However, the sequences of the list can be sorted in any order. Thus, the list contains the pre-defined sequence(s).

For instance, the list of at least one predefined sequence comprises data that can be compared with the amplitude(s) derived from the sequence received so that the decision step is simplified.

A chunk generally relates to a data block of the radio frequency sequence received.

The radio frequency sequence may correspond to a training sequence, a synchronization sequence, a reference sequence and/or broadcast data packets.

Accordingly, the list, which can comprise the pre-defined sequence(s), may comprise training sequence(s), synchronization sequence(s), reference sequence(s) and/or broadcast data packets.

According to an aspect, the amplitudes are saved for further processing. Hence, the amplitudes of the second subset of a certain sequence received can be used for further processing at a later time, for instance.

Another aspect provides that each sequence of the radio frequency signal is split in the plurality of chunks. The radio frequency signal received may comprise several radio frequency sequences that can be processed individually as described above. Thus, each of the radio frequency sequences is split into a plurality of chunks that may be divided into the subsets. The number of chunks may vary for the different radio frequency sequences.

Generally, at least the splitting, equalizing and measuring steps may be repeated several times. By doing so, different subsets are used for equalizing the radio frequency channel and measuring purposes. Hence, the amplitudes of different chunks are measured in the respective repetitions of the measuring steps. The number of repetitions may be indicated by the parameter 1.

Particularly, at least the splitting, equalizing and measuring steps may be repeated several times for each sequence of the radio frequency signal. Therefore, each of the different radio frequency sequences encompassed by the radio frequency signal measured are processed in a similar manner.

For instance, at least the splitting, equalizing and measuring steps are repeated once up to the number of the plurality of chunks. Thus, the number of repetitions may vary for the different radio frequency sequences depending on the number of chunks in which the radio frequency sequence was split previously.

A radio frequency sequence may comprise 132 carriers, also called components or symbols depending on the kind of signal or rather sequence. The respective sequence may be split into n=132 chunks (splitting step). Then, the equalizing step is done wherein m=131 out of the n=132 carriers are used for equalizing the radio frequency channel (forming the first subset of chunks) whereas the remaining k=1 carrier (forming the second subset of chunks), in particular its amplitude, is measured in the measuring step.

According to another aspect, the amplitudes measured are accumulated into a number of accumulated amplitudes. The accumulation is also called cumulating or rather cumulation so that the accumulated amplitudes correspond to cumulated amplitudes. The accumulation indicates the occurrence of certain values. For instance, the amplitudes measured are accumulated so that for each sequence received and processed a certain number of accumulated amplitudes are provided which may be indicated by j. In fact, the number of accumulated amplitudes is between 1 and the product of repetitions and the number of chunks used for the measuring step for each sequence investigated as described above so that j is between 1 and k*l.

Generally, the accumulation step ensures that the noise is reduced that may be contained in the amplitudes measured directly. Thus, better results are obtained so that the false detection rate is further decreased.

The accumulated amplitudes may be used for the decision step. Thus, the accumulated amplitudes derived from the amplitudes measured are taken into account in order to verify whether the accumulated amplitudes correspond to a predefined sequence listed in the respective list.

As already mentioned, the list of at least one predefined sequence may comprise data that can be used for comparing purposes, namely the comparison of the amplitudes measured directly or the accumulated amplitudes derived from the amplitudes measured directly.

Moreover, the decision step can be done by an estimation unit that is configured to perform an estimation whether the (accumulated) amplitudes correspond to a noise or an interfering signal or whether the amplitudes of the sequence received correspond to a radio frequency signal that comprises the at least one radio frequency sequence listed. The estimation unit is configured to process the (accumulated) amplitudes appropriately such that the respective decision can be done. Accordingly, the decision unit comprises the estimation unit.

Generally, the respective estimation processes used for the decision step such as interference and/or noise estimations are known in the state of the art.

Particularly, the real parts of the amplitudes measured are accumulated. Hence, the imaginary part is neglected for the accumulation step, in particular the phase information.

For instance, the absolute values of the respective amplitudes may be accumulated which are also called magnitudes.

Further, the result of the decision step may be at least one of presented to an operator, transferred to a memory and used for further processing. In case of only one sequence being listed in the list, the processing is stopped and the respective result is outputted and/or transferred to the memory. In case of several predefined sequences listed, the radio frequency signal received may also be tested for the other predefined sequences subsequently.

For instance, the steps are done for each predefined sequence of the list. Thus, the splitting, equalizing and measuring steps are done for all predefined sequence. In addition, the decision step is also done for each predefined sequence of the list.

Moreover, the steps are done for a subset of the predefined sequences of the list. Hence, a certain test procedure may be applied that comprises only a certain subset of predefined sequences to be tested for the radio frequency signal received. Such test procedure may be advantageous if only a certain kind of radio frequency transmitter is to be identified so that only few of all predefined sequences have to be taken into account.

According to a certain embodiment, a phase shift of the at least one sequence of the radio frequency signal may be removed previously. This step can be done in case of several sequences of the same kind wherein the phase shifts per sequence caused by frequency offsets between the receiver and the transmitter, for instance due to the Doppler effect, are removed appropriately. Then, the phase corrected sequences can be accumulated in order to reduce the noise as mentioned previously. In general, the accumulated sequences being phase shifted are introduced to the steps mentioned above, namely the splitting, equalizing and measuring steps as well as the decision step.

The first subset and the second subset together may correspond to the plurality of chunks. The chunks obtained by the splitting step are divided into two subsets wherein the first one is used for equalizing the radio frequency channel and the other one is used for measuring purposes. Thus, all chunks are used appropriately.

Generally, the chunks may be assigned to components of the radio frequency sequence. The components may relate to the (sub-)carriers used for data transmission.

Particularly, the components correspond to (sub-)carriers of an orthogonal frequency-division multiplexing Hence, so-called orthogonal frequency-division multiplexing symbols (OFDM symbols) are used. The OFDM generally ensures a multi-carrier modulation comprising a large number of closely spaced orthogonal sub-carrier signals with overlapping spectrum for carrying the respective data.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
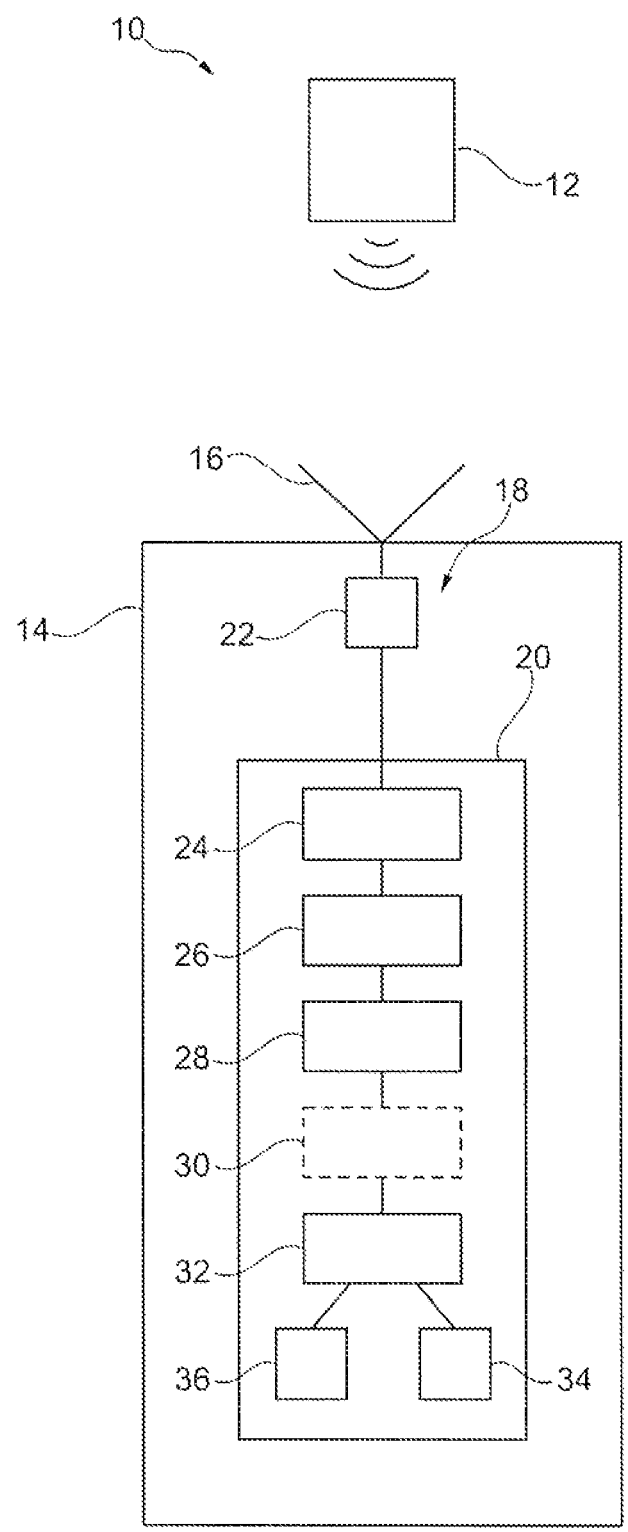
FIG. 1 shows a schematic overview of a system according to an embodiment of the present disclosure.

In FIG. 1, a system 10 for identifying a radio frequency transmitter 12 is shown wherein the radio frequency transmitter 12 emits at least one radio frequency sequence in a periodic manner.

The system 10 comprises a measurement and analyzing device 14 with at least one receiving antenna unit 16 that is assigned to a radio frequency channel 18 for processing the signals received via the receiving antenna unit 16.

Further, the system 10, in particular measurement and analyzing device 14, comprises a processing unit 20 that is used for processing the radio frequency signal received, in particular the respective radio frequency sequence(s) of the radio frequency signal received.

Moreover, the system 10, in particular measurement and analyzing device 14, comprises a down-converter 22 that is positioned between the receiving antenna unit 16 and the processing unit 20. The down-converter 22 is configured to down-convert the radio frequency signal received, in particular the radio frequency sequence(s), into the baseband for further processing.

Hence, the processing unit 20 receives the down-converted signal for further processing.

Figure 2:
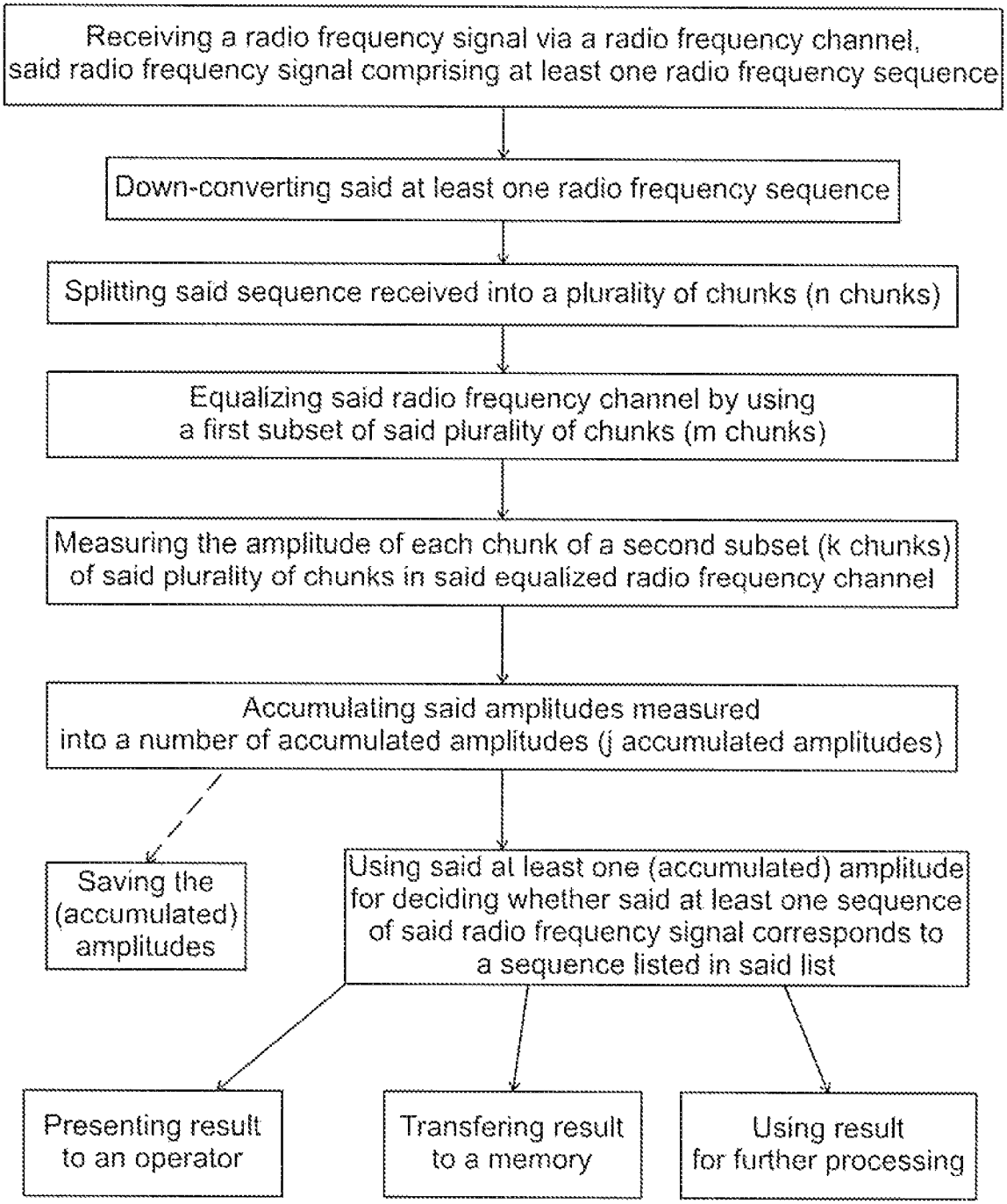
FIG. 2 shows a flowchart illustrating a method according to an embodiment of the present disclosure.

In general, the processing unit 20 comprises a splitting unit 24, an equalizing unit 26, a measuring unit 28, an optional accumulation unit 30 as well as a decision unit 32. The functions of the different units 24-32 encompassed by the processing unit 20 will be described hereinafter with reference to FIG. 2 illustrating a method for identifying the radio frequency transmitter 12.

The system 10, in particular measurement and analyzing device 14, is configured to receive a radio frequency signal via its at least one receiving antenna unit 16 such that the radio frequency signal received is forwarded to the processing unit 20 via the radio frequency channel 18 wherein the down-converter 22 is assigned to the radio frequency channel 18.

Hence, the radio frequency signal received is down-converted by the down-converter 22 at the beginning such that a down-converted signal is forwarded to the processing unit 20 via the radio frequency channel 18.

The processing unit 20, in particular the splitting unit 24, is configured to split the at least one radio frequency sequence received into a plurality of chunks that are used for further processing. The chunks generally correspond to data blocks of the respective radio frequency sequence.

The plurality of chunks is divided into at least two subsets of chunks wherein a first subset of the plurality of chunks is used by the equalization unit 24 to equalize the radio frequency channel 18 appropriately.

The other subset, also called second subset, is used in a different manner as the amplitude of each chunk of the second subset is measured in the equalized radio frequency channel 18. The respective amplitude of each chunk is then used for further processing.

The steps mentioned above, namely the splitting of the radio frequency sequence received into the plurality of chunks, the dividing of the plurality of chunks into at least two different subsets, the equalizing of the radio frequency channel 18 as well as the measuring of the amplitudes of the chunks of the second subset, are performed several times subsequently.

In general, the number of repetitions, indicated by l, may equal the number of the plurality of chunks. In fact, the number of repetitions is between 1 and the number of the plurality of chunks.

For example, the radio frequency sequence received is split into n chunks wherein m chunks are used for the first subset and k chunks are used for the second subset. Both subsets, namely the m chunks and the k chunks, together correspond to the overall number of chunks, namely n chunks. Thus, the number of repetitions may be between 1 and n.

Figure 3:
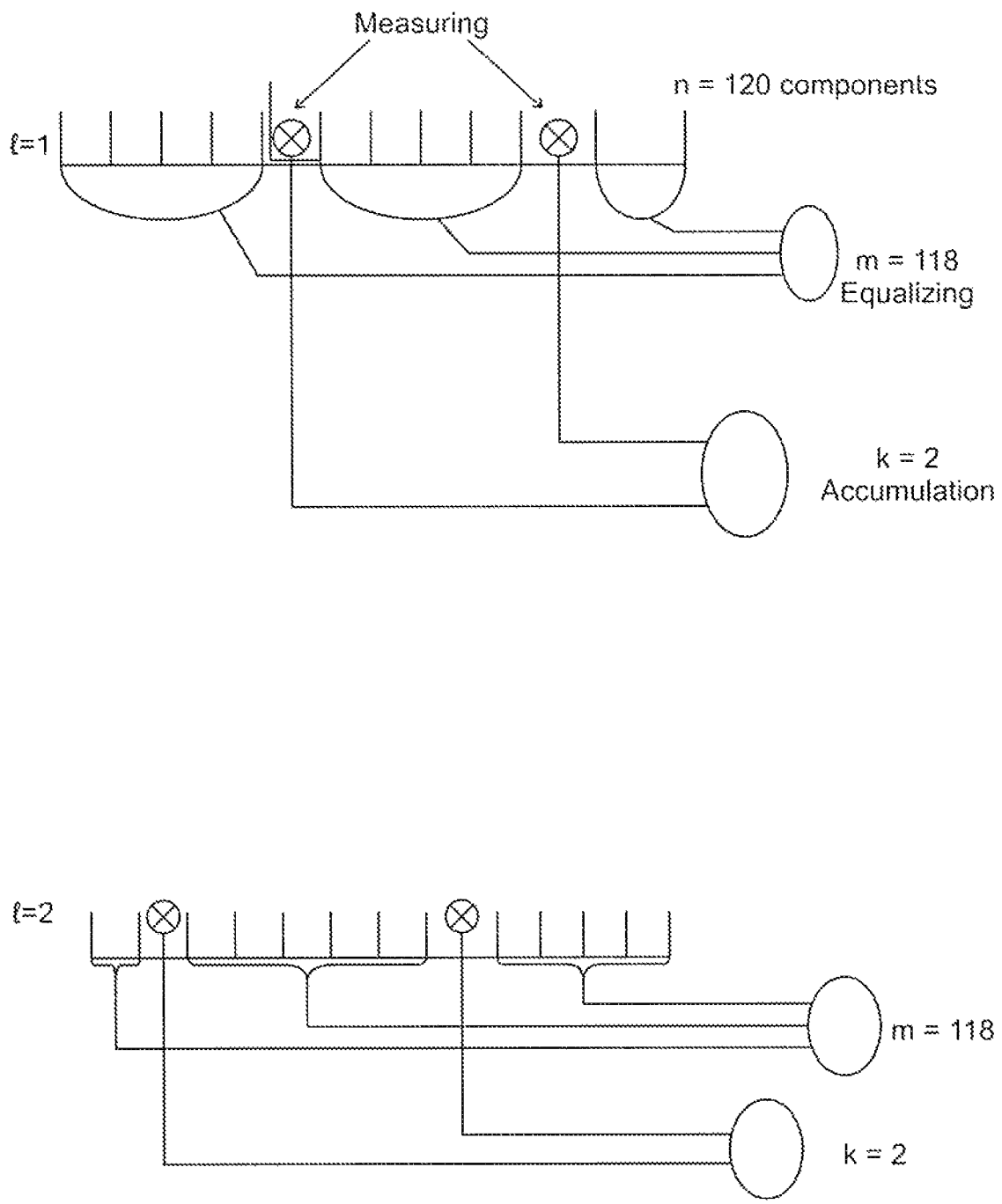
FIG. 3 shows a schematic representation illustrating the concept of the method wherein the chunks are split and divided into different subsets.

In FIG. 3, two representative repetitions (l=1, 2) are shown wherein the radio frequency sequence received is split into n=120 chunks by the splitting unit 24. The 120 chunks correspond to 120 components of the radio frequency signal. For instance, the components refer to orthogonal frequency-division multiplexing (OFDM) symbols, namely (sub-)carriers of an orthogonal frequency-division multiplexing signal (OFDM signal).

In the first repetition indicated by l=1, the 120 chunks are divided into two subsets wherein m=118 chunks of the 120 chunks form the first subset that is used for equalizing the radio frequency channel 18 by the equalizing unit 26 whereas the remaining k=2 chunks are used for measuring purposes by the measuring unit 26. Hence, the amplitudes of the two chunks relating to the second subset are measured in the radio frequency channel 18 equalized previously by the first subset.

The respective amplitudes may be accumulated for the first repetition, in particular their real parts.

Then, the (accumulated) amplitudes can be used for a decision step done by the decision unit 32. In this decision step, the (accumulated) amplitudes as well as predefined sequences in a list are taken into account in order device whether the sequence received corresponds to a predefined sequence.

In the second repetition indicated by l=2, two other chunks of the n=120 chunks (second subset) are used for measuring purposes whereas m=118 chunks (first subset) are used for equalizing the radio frequency channel 18 previously. In a similar manner as mentioned above, the amplitudes of the k=2 chunks of the second subset may be accumulated wherein the accumulated amplitudes are used for the comparing step.

The amplitudes measured are accumulated into j accumulated amplitudes so that the number j is between 1 and the product of k*l. Hence, the amplitudes measured, in particular their real parts, may be accumulated in different ways. For instance, all amplitudes measured of a certain step (repetition) are accumulated. Moreover, the amplitudes measured of different steps (repetitions) may be accumulated.

Generally, the radio frequency sequence received is split into n chunks wherein m chunks are used for the first subset and k chunks are used for the second subset. The sum of m and k equals n such that all chunks obtained are divided into the two subsets.

Different chunks may be used for the measuring step so that several repetitions are provided. The number of repetitions is l, wherein l is between 1 and n.

Moreover, the amplitudes measured may be accumulated such that j accumulated amplitudes are obtained, wherein j is between 1 and the product of k and l.

The best results are obtained for j=n, k=1 and l=n. Thus, the second subset comprises only one chunk wherein as many repetitions as possible are done.

As already described, the decision step is done by the decision unit 32 that evaluates whether the (accumulated) amplitudes of the at least one sequence received is assigned to one of the predefined sequences listed in the list.

In case of a positive identification, the result is presented to the operator via a display unit 34 and/or transferred to a memory 36.

Alternatively or additionally, the respective result obtained by the decision unit 32 can be used for further processing, for instance in case of testing several sequences and/or checking a plurality of predefined sequences of the list.

In case of a negative identification, the result is provided in a similar manner.

Generally, the steps mentioned above are done for each predefined sequence of the list. Hence, the respective steps are repeated for each predefined sequence. However, a certain subset of the predefined sequences of the list may be used. This may accelerate the identification since a certain type of radio frequency transmitter can be searched in a more efficient manner while only checking the predefined sequences being worth considering.

Moreover, a phase shift of the at least one sequence of the radio frequency signal received may be removed previously in order to reduce the noise and improve the quality of the identifying process appropriately. Then, the phase corrected radio frequency sequence is exposed to the different steps mentioned above, in particular the splitting, equalizing, measuring, (accumulating) and decision steps.

Generally, the method as well as the system 10 provides a better detection of the radio frequency transmitter 12 wherein the probability of ghost codes is decreased significantly.

The method described above as well as the system 10 can be used for identifying an interferer, identifying a radio frequency transmitter and/or estimating the location of a transmitter.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for identifying a radio frequency transmitter transmitting at least one radio frequency sequence, comprising:

receiving a radio frequency signal via a radio frequency channel, said radio frequency signal comprising at least one radio frequency sequence;

splitting said sequence received into a plurality of chunks;

equalizing said radio frequency channel by using a first subset of said plurality of chunks, which results in an equalized radio frequency channel used for processing the at least one radio frequency sequence encompassed by the radio frequency signal;

measuring the amplitude of each chunk of a second subset of said plurality of chunks in said equalized radio frequency channel;

accumulating said amplitudes measured into a number of accumulated amplitudes;

repeating at least said splitting, equalizing and measuring steps several times, wherein different subsets are used for equalizing said radio frequency channel and measuring purposes; and using said accumulated amplitudes obtained from said amplitudes measured in said equalized radio frequency channel for deciding whether said at least one sequence of said radio frequency signal corresponds to a sequence listed in a list.

2. The method according to claim 1, wherein said amplitudes are saved for further processing.

3. The method according to claim 1, wherein each sequence of said radio frequency signal is split into said plurality of chunks.

4. The method according to claim 1, wherein at least said splitting, equalizing and measuring steps are repeated several times for each sequence of said radio frequency signal.

5. The method according to claim 1, wherein at least said splitting, equalizing and measuring steps are repeated once up to the number of said plurality of chunks.

6. The method according to claim 1, wherein the real parts of said amplitudes measured are accumulated.

7. The method according to claim 1, wherein the result of said decision step is at least one of presented to an operator, transferred to a memory and used for further processing.

8. The method according to claim 1, wherein said steps are done for each predefined sequence of said list.

9. The method according to claim 1, wherein said steps are done for a subset of said predefined sequences of said list.

10. The method according to claim 1, wherein a phase shift of said at least one sequence of said radio frequency signal is removed previously.

11. The method according to claim 1, wherein said first subset and said second subset together correspond to said plurality of chunks.

12. The method according to claim 1, wherein said chunks are assigned to components of said radio frequency sequence received.

13. The method according to claim 12, wherein said components correspond to carriers of an orthogonal frequency-division multiplexing.

14. A system for identifying a radio frequency transmitter emitting at least one radio frequency sequence, comprising at least one receiving antenna unit connected to a radio frequency channel and a processing unit, said processing unit comprising a splitting unit configured to split said radio frequency sequence received into a plurality of chunks;

said processing unit further comprising an equalization unit configured to equalize said radio frequency channel by using a first subset of said plurality of chunks in order to obtain an equalized radio frequency channel used for processing the at least one radio frequency sequence encompassed by the radio frequency signal;

said processing unit further comprising a measuring unit configured to measure the amplitude of each chunk of a second subset of said plurality of chunks in said equalized radio frequency channel, said amplitudes measured being accumulated into a number of accumulated amplitudes; and said processing unit further comprising a decision unit configured to use said accumulated amplitudes obtained from said amplitudes measured in said equalized radio frequency channel for deciding whether said at least one sequence of said radio frequency signal corresponds to a sequence listed in a list, said processing unit being configured to repeat at least said splitting, equalizing and measuring several times, wherein different subsets are used for equalizing said radio frequency channel and measuring purposes.

15. The system according to claim 14, wherein a down-converter is provided, said down-converter being configured to down-convert said radio frequency sequence received into the baseband.

16. A method for at least one of identifying an interferer, identifying a radio frequency transmitter transmitting at least one radio frequency sequence or estimating the location of a transmitter via a system according to claim 14, the method comprising:

receiving a radio frequency signal via the radio frequency channel, said radio frequency signal comprising at least one radio frequency sequence;

splitting said sequence received into a plurality of chunks;

equalizing said radio frequency channel by using a first subset of said plurality of chunks;

measuring the amplitude of each chunk of a second subset of said plurality of chunks in said equalized radio frequency channel; and using said at least one amplitude for deciding whether said at least one sequence of said radio frequency signal corresponds to a sequence listed in a list.

* * * * *